United States Patent
Ozawa

(10) Patent No.: US 8,942,507 B2
(45) Date of Patent: Jan. 27, 2015

(54) SIGNAL PROCESSING METHOD FOR PRODUCING INTERPOLATED SIGNAL VALUES IN AN IMAGE SIGNAL

(71) Applicant: Naoki Ozawa, Akishma (JP)

(72) Inventor: Naoki Ozawa, Akishma (JP)

( * ) Notice: Subject to any disclaimer, the term of this patent is extended or adjusted under 35 U.S.C. 154(b) by 52 days.

(21) Appl. No.: 13/932,003

(22) Filed: Jul. 1, 2013

(65) Prior Publication Data

US 2015/0003754 A1  Jan. 1, 2015

(51) Int. Cl.
*G06T 3/40* (2006.01)

(52) U.S. Cl.
CPC ............. *G06T 3/4007* (2013.01); *G06T 3/4084* (2013.01)
USPC ........................................................ 382/277

(58) Field of Classification Search
CPC ....... H04N 7/50; H04N 7/30; H04N 7/26244; H04N 7/26313; H04N 7/26079; G06T 3/00; G06T 3/40; G06T 1/60; G06T 3/60; G06F 17/148

USPC ............................................ 382/275, 277, 300
See application file for complete search history.

(56) References Cited

U.S. PATENT DOCUMENTS 7,139,443 B2 * 11/2006 Ozawa .......................... 382/300

* cited by examiner

*Primary Examiner* — Duy M Dang

(57) ABSTRACT

The signal processing method of the present invention produces interpolated signal values in an image signal by an inverse discrete cosine transformation with a set of frequency coefficients by decreasing an interval for reproduction of pixel signal values, wherein a set of frequency coefficients is provided by a discrete cosine transformation and is compensated for the frequency response caused by dividing pixels. According to the invention, an image signal similar to that obtained with a solid-state imaging device constructed by divided pixels is provided. Hence, even when the number of horizontal pixels and/or the number of vertical pixels of the solid-state imaging device are a half of that of a display apparatus used, an image signal suitable to the display apparatus can be produced.

8 Claims, 8 Drawing Sheets horizontal location: j

| | 0 | 1 | 2 | 3 | 4 | 5 | 6 | 7 |
|---|---|---|---|---|---|---|---|---|
| 0 | x(0,0) | x(0,1) | x(0,2) | x(0,3) | x(0,4) | x(0,5) | x(0,6) | x(0,7) |
| 1 | x(1,0) | x(1,1) | x(1,2) | x(1,3) | x(1,4) | x(1,5) | x(1,6) | x(1,7) |
| 2 | x(2,0) | x(2,1) | x(2,2) | x(2,3) | x(2,4) | x(2,5) | x(2,6) | x(2,7) |
| 3 | x(3,0) | x(3,1) | x(3,2) | x(3,3) | x(3,4) | x(3,5) | x(3,6) | x(3,7) |
| 4 | x(4,0) | x(4,1) | x(4,2) | x(4,3) | x(4,4) | x(4,5) | x(4,6) | x(4,7) |
| 5 | x(5,0) | x(5,1) | x(5,2) | x(5,3) | x(5,4) | x(5,5) | x(5,6) | x(5,7) |
| 6 | x(6,0) | x(6,1) | x(6,2) | x(6,3) | x(6,4) | x(6,5) | x(6,6) | x(6,7) |
| 7 | x(7,0) | x(7,1) | x(7,2) | x(7,3) | x(7,4) | x(7,5) | x(7,6) | x(7,7) | vertical location: i

FIG.3

| | horizontal location: v | | | | | | | |
|---|---|---|---|---|---|---|---|---|
| vertical location: u | | 0 | 1 | 2 | 3 | 4 | 5 | 6 | 7 |
| | 0 | 1.000 | 1.005 | 1.019 | 1.045 | 1.062 | 1.134 | 1.203 | 1.294 |
| | 1 | 1.005 | 1.010 | 1.024 | 1.050 | 1.088 | 1.139 | 1.209 | 1.300 |
| | 2 | 1.019 | 1.024 | 1.039 | 1.065 | 1.103 | 1.156 | 1.227 | 1.319 |
| | 3 | 1.045 | 1.050 | 1.065 | 1.092 | 1.131 | 1.185 | 1.257 | 1.352 |
| | 4 | 1.062 | 1.088 | 1.103 | 1.131 | 1.171 | 1.227 | 1.302 | 1.400 |
| | 5 | 1.134 | 1.139 | 1.156 | 1.185 | 1.227 | 1.285 | 1.364 | 1.467 |
| | 6 | 1.203 | 1.209 | 1.227 | 1.257 | 1.302 | 1.364 | 1.448 | 1.557 |
| | 7 | 1.294 | 1.300 | 1.319 | 1.352 | 1.400 | 1.467 | 1.557 | 1.674 |

FIG. 6

$$F(u,v) = \frac{2}{N} \cdot \sum_{i=0}^{N-1} \sum_{j=0}^{N-1} C(u) \cdot C(v) \cdot x(i,j)$$
$$\cdot \cos\frac{(2i+1)u\pi}{2N} \cdot \cos\frac{(2j+1)v\pi}{2N} \quad (1)$$
$$C(u), C(v) = \frac{1}{\sqrt{2}} \quad u,v = 0$$
$$= 1 \quad u,v \neq 0$$

$$x2(i,j) = \frac{2}{N} \cdot \sum_{u=0}^{N-1} \sum_{v=0}^{N-1} C(u) \cdot C(v) \cdot F2(u,v)$$
$$\cdot \cos\frac{(i+1)u\pi}{2N} \cdot \cos\frac{(j+1)v\pi}{2N} \quad (7)$$
$$C(u), C(v) = \frac{1}{\sqrt{2}} \quad u,v = 0$$
$$= 1 \quad u,v \neq 0$$

FIG.9

SIGNAL PROCESSING METHOD FOR PRODUCING INTERPOLATED SIGNAL VALUES IN AN IMAGE SIGNAL

CROSS-REFERENCE TO RELATED APPLICATION

Not Applicable

BACKGROUND OF THE INVENTION

1. Field of the Invention

This invention relates to an image signal processing method, and more particularly, to such image signal processing method for producing interpolated signal values in an image signal.

2. Description of the Prior Art

The most high-resolution image signal that can be got from broadcast services in Japan is called "full-high-vision" which is constructed by horizontal 1920 pixels and vertical 1080 pixels. On the other hand, an advanced image signal system called "4K" which is constructed by double number of horizontal pixels and double number of vertical pixels compared with "full-high-vision" has been developed recently. In addition, display apparatuses for image signals of "4K" are already available. Thereby, some methods that convert the image signal of "full-high-vision" to the image signal of "4K" by interpolating pixels are proposed.

Conventional methods for providing interpolated pixel signal values in an image signal are well known as the bi-linear interpolating methods or the bi-cubic interpolating methods. Furthermore, methods that produce interpolated pixel signal values in an image signal by a discrete cosine transformation and an inverse discrete cosine transformation are disclosed in U.S. Pat. No. 5,168,375 issued Dec. 1, 1992 to M. Reisch et al. and U.S. Pat. No. 7,139,443 issued Nov. 22, 2006 to N. Ozawa.

The methods disclosed in those patents are accomplished by extracting a block of pixel signal values from an image signal, providing a set of frequency coefficients by a discrete cosine transformation with the block of pixel signal values, and providing interpolated pixel signal values by an inverse discrete cosine transformation, decreasing the sampling interval from that of original sampling locations, with the set of frequency coefficients. Since the set of frequency coefficients generated with the original pixel signal values is used for the inverse discrete cosine transformation, the frequency content of the image signal is not affected by the interpolated pixel signal values.

In addition, it is disclosed in U.S. Pat. No. 5,168,375 that the filtering function for an image signal produced by the inverse discrete cosine transformation is accomplished by modifying the set of frequency coefficients. Thus, the filtering function is accomplished by a simplified process when interpolated pixel signal values are produced by the discrete cosine transformation and the inverse discrete cosine transformation. On the other hand, since the filtering function in the spatial domain is accomplished by convolving a block of pixel signal values with a filter kernel, the procedure of the filtering function in the spatial domain is complicated.

Moreover, it is disclosed in U.S. Pat. No. 7,139,443 that an interpolated pixel signal value produced by the discrete cosine transformation and the inverse discrete cosine transformation is provided by a linear combination of each pixel signal value in a block of pixel signal values. By applying these methods, a procedure producing interpolated signal values becomes more simplified.

Meanwhile, most of image capturing apparatuses, not only video cameras and digital still cameras for consumer but also television cameras for broadcast, are fabricated with solid-state imaging devices recently. In an image capturing apparatus employing a solid-state imaging device, an image signal captured by pixels arranged on the imaging area of the solid-state imaging device is converted in an image signal format corresponding to a display apparatus used. Hence, when a television camera for the image signal of "full-high-vision" is fabricated by a solid-state imaging device comprising horizontal 1920 pixels and vertical 1080 pixels, each pixel of the solid-state imaging device corresponds to each pixel of the display apparatus for the image signal of "full-high-vision".

Therefore, the conversion of the image signal of "full-high vision" to the image signal of "4K" corresponds to dividing each pixel of the solid-state imaging device in a half of the original pixels in the horizontal direction and the vertical direction. Then, when the image signal of "4K" is produced by interpolating the image signal of "full-high vision" provided by a solid-state imaging device, the image signal of "4K" should be compensated by the frequency response caused by dividing pixels of the solid-state imaging device. However, a filtering characteristic suitable to compensate the frequency response caused by dividing pixels of the solid-state imaging device is not disclosed in the prior art.

BRIEF SUMMARY OF THE INVENTION

The object of the present invention is to provide a signal processing method for producing interpolated signal values in an image signal by the discrete cosine transformation and the inverse discrete cosine transformation, wherein the signal processing method comprises compensating for the frequency response caused by dividing pixels of the solid-state imaging device.

The object of the invention is achieved by extracting a block of pixel signal values from the pixel signal values of an image signal, producing a set of frequency coefficients by an orthogonal transformation with the block of pixel signal values, providing a set of compensating coefficients, converting the set of frequency coefficients to a set of compensated frequency coefficients by multiplying each compensating coefficient of the set of compensating coefficients to a corresponding frequency coefficient of the set of frequency coefficients, producing at least one represented pixel signal value that corresponds to an arbitrary location between adjacent pixel signal values of the block of pixel signal values by an inverse transformation of the orthogonal transformation with the set of compensated frequency coefficients by decreasing an interval for reproduction of pixel signal values, and applying the represented pixel signal value to a converted image signal as a pixel signal value corresponding to the arbitrary location of the converted image signal. Here, each compensating coefficient of the set of compensating coefficients corresponds to a ratio of a frequency response caused by sampling by the pixels of the converted image signal to a frequency response caused by sampling by the pixels of the image signal at corresponding frequency.

According to this method, an image signal similar to that obtained with a solid-state imaging device constructed by divided pixels is provided. Consequently, even when the number of horizontal pixels and/or the number of vertical pixels of the solid-state imaging device are a half of that of a display apparatus used, an image signal suitable to the display apparatus can be produced.

BRIEF DESCRIPTION OF THE DRAWINGS

The invention is described with reference to the drawings, wherein:

FIG. 3 is an illustration of the block of pixel signal values;

FIG. 6 is an example of the compensating coefficients usable in the frequency response compensator;

FIG. 9 shows formula 1 and formula 7.

DETAILED DESCRIPTION OF THE INVENTION

Figure 1:
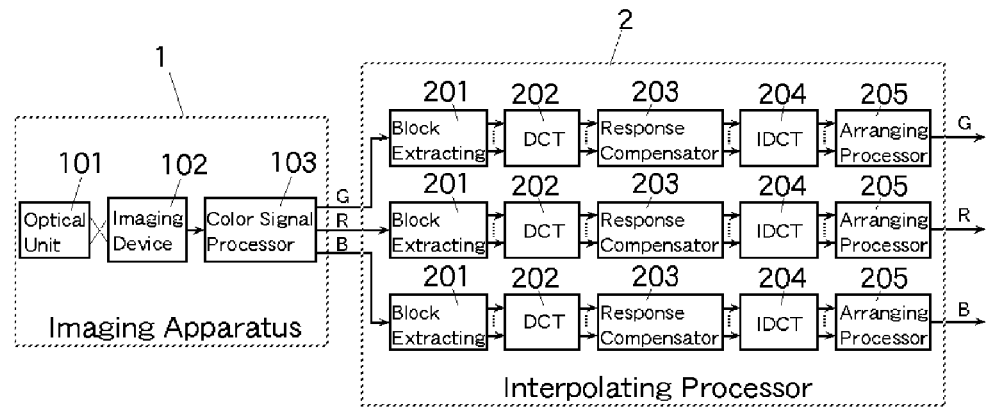
FIG. 1 is a block diagram showing the structure of an imaging apparatus according to a preferred embodiment of the present invention.

Referring now to the drawings, exemplary embodiments of the invention will be described. An example of the video apparatus in which the invention is applied is shown in FIG. 1.

In the video apparatus shown in FIG. 1, reference numeral 1 represents a imaging apparatus. In the imaging apparatus 1, a solid-state imaging device 102 converts an image captured by an optical unit 101 including a lens to an image signal. Here, the image signal is converted to a red signal, a green signal, and a blue signal by a color signal processor 103. There, each signal of the red signal, the green signal, and the blue signal is assumed to comprise pixel signal values corresponding to all pixels of the solid-state imaging device 102.

Next, reference number 2 represents an interpolating processor in FIG. 1. In the interpolating processor 2, each of the red signal, the green signal, and the blue signal is applied to a block-extracting processor 201 respectively. The block-extracting processor 201 extracts a block of pixel signal values corresponding to the block of 64 pixels fabricated by 8 adjoined pixels in a horizontal direction and 8 adjoined pixels in a vertical direction, and outputs pixel signal values corresponding to all pixels in the block of pixels simultaneously. The block of pixel signal values from the block-extracting processor 201 are applied to a discrete cosine transformer 202, and are converted to a set of frequency coefficients, being composed by 8 horizontal frequency coefficients and 8 vertical frequency coefficients, by a discrete cosine transformation.

The set of frequency coefficients outputted from the discrete cosine transformer 202 is applied to a frequency response compensator 203, and is compensated by multiplying each frequency coefficient with the compensating coefficient that corresponds to the frequency response caused by dividing pixels of the solid-state imaging device. The set of compensated frequency coefficients outputted from the frequency response compensator 203 is applied to an inverse discrete cosine transformer 204. In the inverse discrete cosine transformer 204, interpolated pixel signal values are generated by an inverse discrete cosine transformation with the set of compensated frequency coefficients, by setting the sampling interval to a half of that of original pixels. Thus, the interpolated pixel signal values corresponding to locations between the adjacent original pixels are produced. As the result, number of the pixels is doubled compared with the original pixels in the horizontal direction and the vertical direction.

Next, the pixel signals generated by the inverse discrete cosine transformer 204 are applied to an arranging processor 205, and are arranged to an image signal corresponding to a display apparatus that has double pixels in the horizontal direction and the vertical direction compared with the solid-state imaging device 102. The image signal outputted from the arranging processor 205 in the interpolating processor 2 is applied to following display apparatus or transmission apparatus that is not shown in FIG. 1.

Referring now to the drawings, the procedure of the interpolating processor 2 will be described in detail, especially being focused to the compensating coefficients employed in the frequency response compensator 203. In the following descriptions, assuming that the green signal, the red signal, and blue signal are processed by same procedure in the interpolating processor 2, only the procedure for the green signal is explained.

Figure 2:
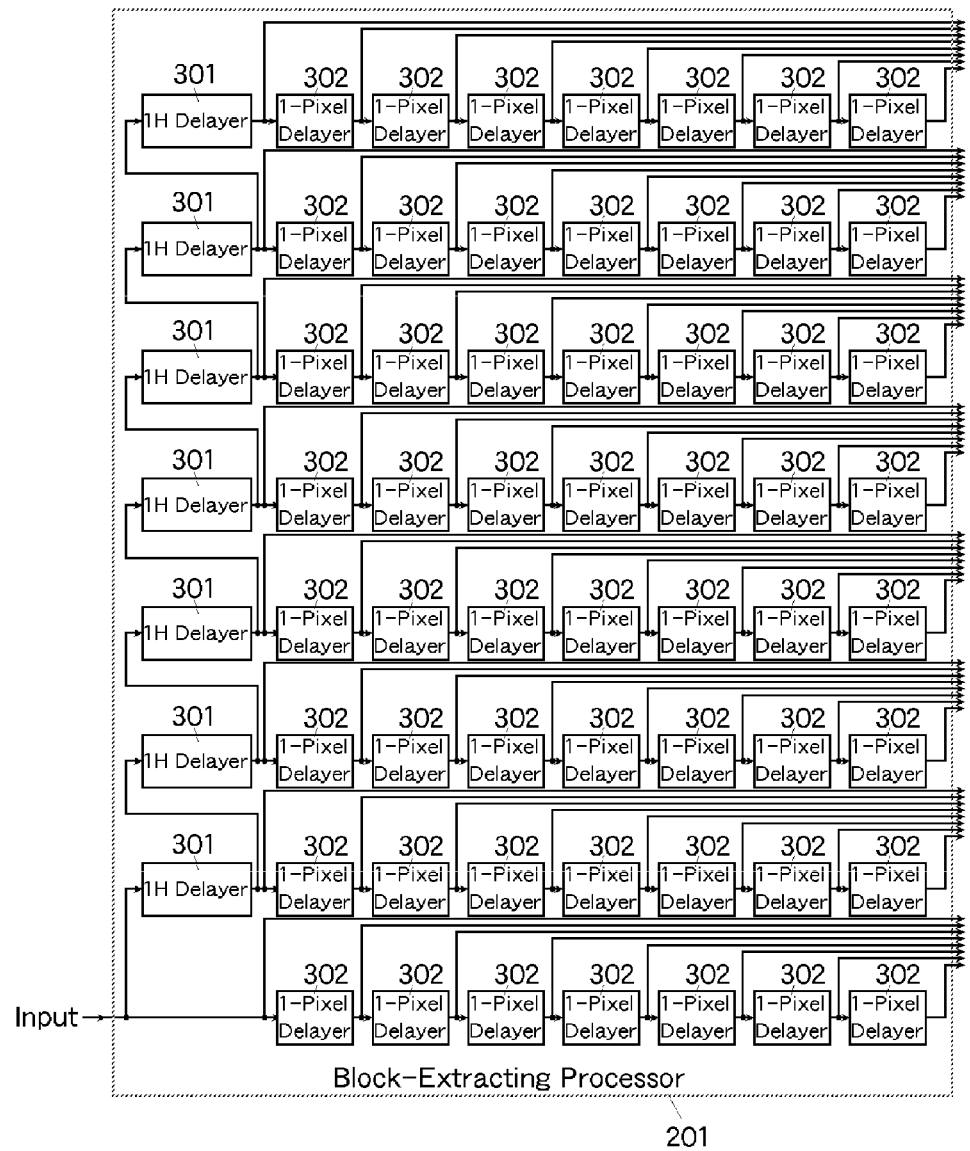
FIG. 2 is a block diagram showing the structure of a block-extracting processor usable in the imaging apparatus shown in FIG. 1.

In the interpolating processor 2, the green signal generated by the color signal processor 103 in the imaging apparatus 1 is applied to the block-extracting processor 201. By the block-extracting processor 201, a block of pixel signal values corresponding to 64 pixels constructed by 8 adjoined pixels in the horizontal direction and 8 adjoined pixels in the vertical direction is extracted from the input signal so that all pixel signal values in the block of pixel signal values are outputted simultaneously. An exemplary embodiment of the block-extracting processor 201 is shown in FIG. 2. As shown in FIG. 2, an input signal is delayed by seven 1H delayers 301 chained in serially, the 1H delayer delaying the input signal for one horizontal scan period. Thus, 8 pixel signal values corresponding to adjoined 8 pixels in the vertical direction are outputted simultaneously. Furthermore, the input signal of the block-extracting processor 201 and output signals of seven 1H delayers 301 are delayed respectively by seven 1-pixel delayers 302 chained in serially, the 1-pixel delayer delaying the input signal for one pixel sampling period. Thus, 8 pixel signal values corresponding to adjoined 8 pixels on a horizontal pixel line are outputted simultaneously. As the result, a block of pixel signal values corresponding to 64 pixels constructed by 8 adjoined pixels in the horizontal direction and 8 adjoined pixels in the vertical direction are outputted from the block-extracting processor 201 simultaneously.

An exemplified block of pixel signal values extracted by the block-extracting processor 201 is shown in FIG. 3. In FIG. 3, "i" represents vertical location of the pixel, and "j" represents the horizontal location of the pixel. Here, the pixel at the top left-hand corner corresponding to i=0 and j=0 is defined as "X(0,0)". Further, "x(0,0)", "x(0,1)", etc. written in the grid mean pixel signal values generated by corresponding pixels.

The block of pixel signal values provided by the block-extracting processor 201 is applied to a discrete cosine transformer 202, and is converted to a set of frequency coefficients by a discrete cosine transformation defined by formula 1 shown in FIG. 9. Assuming N=8 in formula 1, the set of frequency coefficients comprises 64 frequency coefficients, corresponding to horizontal 8 frequencies represented with v=0 to 7 and vertical 8 frequencies represented with u=0 to 7. Here, "F(u,v)" is defined as the frequency coefficient corresponding to horizontal frequency v and vertical frequency u.

The set of frequency coefficients is applied to the frequency response compensator 203, and is compensated with the frequency response caused by dividing pixels of the solid-state imaging device. Next, the frequency response caused by dividing pixels is explained.

Figure 4A:
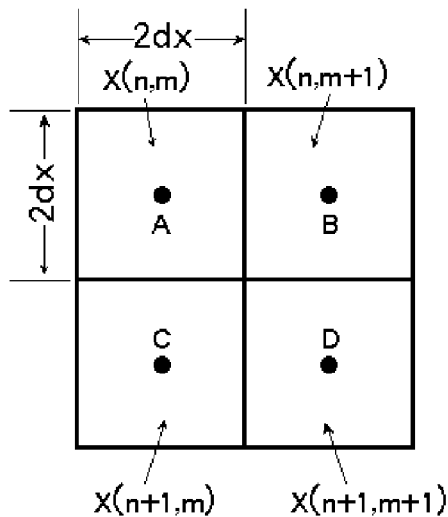
FIG. 4A is an illustration of adjacent four pixels not divided.

An example of four pixels adjacent in the horizontal direction and the vertical direction is represented in FIG. 4A. Here, the aperture ratio of the pixel is assumed to be approximately 100%. The aperture ratio being 100% means a situation in which all the light injected to a pixel is employed to generate the pixel signal, and can be realized by a back-illuminated imaging device or by an imaging device which combined a micro lens on each pixel.

In FIG. 4A, pixel signal values generated by X(n,m), X(n, m+1), X(n+1,m), and X(n+1,m+1) are outputted as x(n,m), x(n,m+1), x(n+1,m), and x(n+1,m+1) which are detected at A, B, C, and D respectively. Here, the pixels shown in FIG. 4A are divided so as to double the number of pixels in the horizontal direction and the vertical direction, wherein the divided pixels comprise the pixels that generate pixel signal values corresponding to A, B, C, and D. Namely, the centers of the pixels provided by dividing are allocated at A, B, C, D, and their middle points as shown in FIG. 4B.

Figure 4B:
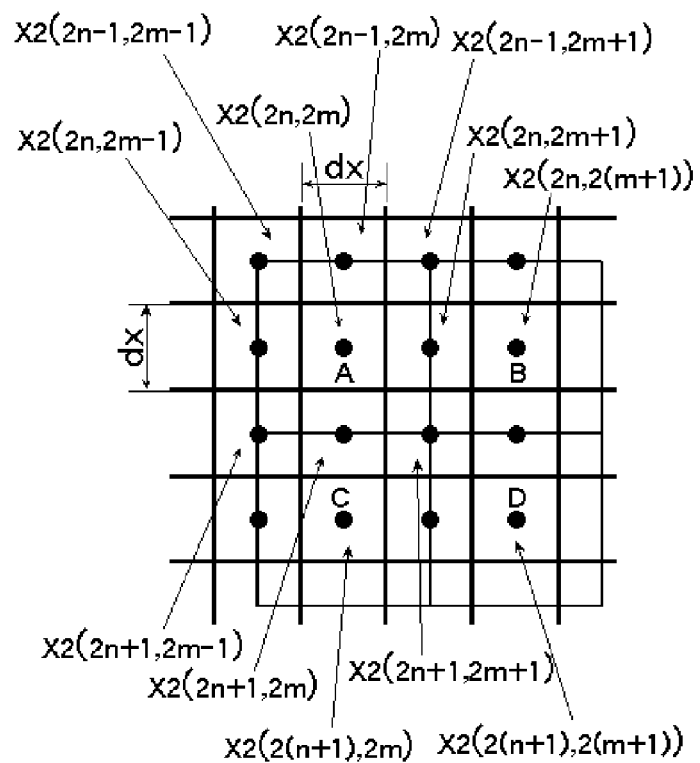
FIG. 4B is an illustration of divided pixels corresponding to the pixels shown in FIG. 4A.

In FIG. 4B, the pixels corresponding to A, B, C, and D are defined as X2 (2n,2m), X2(2n,2(m+1)), X2(2(n+1),2m), and X2(2(n+1),2(m+1)) respectively. Likewise, the pixel corresponding to the middle point of A and B is defined as X2(2n, 2m+1), and the pixel corresponding to the middle point of A and C is defined as X2(2n+1,2m). Similarly, the upper-left pixel of the pixel X2(2n,2m) is defined as X2(2n−1,2m−1), the upper pixel of the pixel X2(2n,2m) is defined as X2(2n−1,2m), the upper-right pixel of the pixel X2(2n,2m) is defined as X2(2n−1,2m+1), the left pixel of the pixel X2 (2n,2m) is defined as X2(2n,2m−1), the right pixel of the pixel X2(2n, 2m) is defined as X2(2n,2m+1), the lower-left pixel of the pixel X2(2n,2m) is defined as X2(2n+1,2m−1), the lower pixel of the pixel X2(2n,2m) is defined as X2(2n+1,2m), and the lower-left pixel of the pixel X2(2n,2m) is defined as X2(2n+1,2m+1) respectively as shown in FIG. 4B.

Comparing FIG. 4B with FIG. 4A, it is known that the pixel X(n,m) includes all of the pixel X2(2n,2m) and a half of the adjacent pixels, X2(2n−1,2m), X2(2n,2m−1), X2(2n,2m+1), and X2 (2n+1,2m). Further, it is known that the pixel X(n, m) also includes a quarter of the pixels, X2(2n−1,2m−1), X2(2n−1,2m+1), X2(2n+1,2m−1), and X2(2n+1,2m+1), which exist in the slanted direction. Thus, when the pixel signal value generated by X2 (2n, 2m) is defined as x2 (2n, 2m), the pixel signal value x(n,m) generated by X(n,m) are represented by formula 2, $$x(n, m) = x2(2n, 2m) + \qquad (2)$$
$$\{x2(2n-1, 2m) + x2(2n, 2m-1) + x2(2n, 2m+1) +$$
$$x2(2n+1, 2m)\} * 1/2 +$$
$$\{x2(2n-1, 2m-1) + x2(2n-1, 2m+1) +$$
$$x2(2n+1, 2m-1) + x2(2n+1, 2m+1)\} * 1/4.$$

For simplification, a pixel signal is assumed to be a one-dimensional signal here. Namely, the pixel signal value x2(2n,2m) is defined as formula 3, $$x2(2n,2m) = \exp(j2*PHI*f*2m*dx), \qquad (3)$$

which represents that the pixel signals vary into a sinusoidal wave only horizontally. Here, "PHI" means the constant pi, "f" means arbitrary frequency, and "dx" is a size of the pixels divided. Consequently, formula 2 is rewritten to formula 4, $$x(n, m) = \qquad (4)$$
$$\exp(j2*PHI*f*2m*dx) + \{\exp(j2*PHI*f*2m*dx) +$$
$$\exp(j2*PHI*f*(2m-1)*dx) +$$
$$\exp(j2*PHI*f*(2m+1)*dx) +$$
$$\exp(j2*PHI*f*2m*dx)\}1/2 +$$
$$\{\exp(j2*PHI*f*(2m-1)*dx) +$$
$$\exp(j2*PHI*f*(2m+1)*dx) +$$
$$\exp(j2*PHI*f*(2m-1)*dx) +$$
$$\exp(j2*PHI*f*(2m+1)*dx)\}*1/4 =$$
$$2*\exp(j2*PHI*f*2m*dx)*$$
$$\{1 + \exp(-j2*PHI*f*dx)/2 +$$
$$\exp(j2*PHI*f*dx)/2\}.$$

Furthermore, by applying $$\exp(jx) = \cos(x) + j\sin(x),$$

formula 4 is rewritten to formula 5, $$x(n,m) = 4*\exp(j2*PHI*f*2m*dx)*\tfrac{1}{2}*\{1+\cos(2*PHI*f*dx)\}. \qquad (5)$$

A forward part of right side of formula 5, exp(j2*PHI*f*2m*dx), represents the original signal that has constant amplitude and varies into a sinusoidal wave. On the other hand, a latter part of right side of formula 5, ½*{1+cos(2*PHI*f*dx)}, represents the frequency response corresponding to the ratio of the image signal generated by sampling by the original pixels to the image signal generated by sampling by the divided pixels. In other words, the reciprocal of ½*{1+cos(2*PHI*f*dx)}, 2/{1+cos(2*PHI*f*dx)}, represents the frequency compensating coefficient corresponding to the ratio of the image signal generated by sampling by the divided pixels to the image signal generated by sampling by the original pixels.

Figure 5:
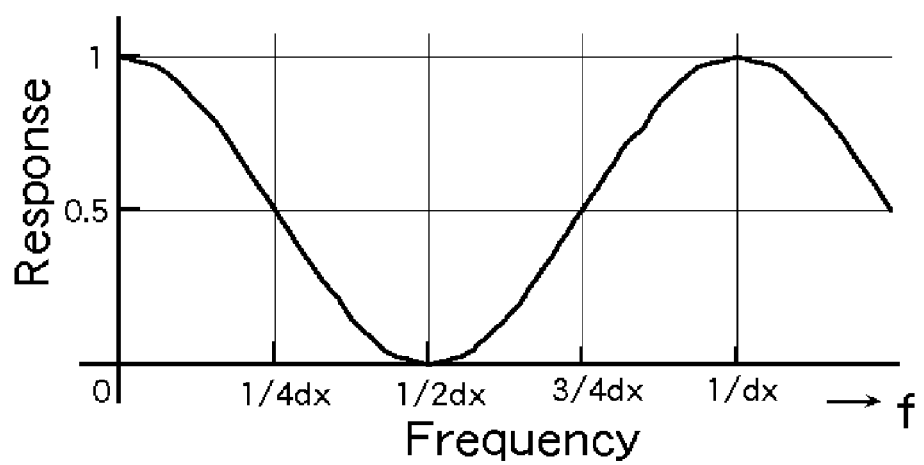
FIG. 5 is a magnitude spectrum representing the ratio of the frequency response caused by sampling by the original pixels to a frequency response caused by sampling by the divided pixels.

The frequency response represented by ½*{1+cos(2*PHI*f*dx)} is shown in FIG. 5. In FIG. 5, the horizontal axis represents the frequency of the image signal, and the longitudinal axis represents the magnitude of response. As shown in FIG. 5, the response at the sampling frequency of the original pixels which is represented by ½dx is zero, and the response at the nyquist frequency of the original pixels which is represented by ¼dx is ½. Furthermore, the nyquist frequency ¼dx corresponds to v=8 in formula 1. Thus, the frequency response R(v) represented by v becomes as formula 6, $$R(v) = 1/2 * \{1 + \cos(2*PHI*(v/32dx)*dx)\} \qquad (6)$$
$$= 1/2 * \{1 + \cos(PHI*v/16)\}.$$

Hence, in the frequency response compensator 203, the reciprocal of the frequency response R(v) is multiplied to the frequency coefficient corresponding to v in the set of the frequency coefficients provided by the discrete cosine transformer 202. Consequently, the set of frequency coefficients provided by a discrete cosine transformation with the original pixel signal values is converted to the compensated frequency coefficients that should be provided by a discrete cosine transformation with the divided pixel signal values.

Though a processing in the horizontal direction is explained in the above descriptions, a processing in the vertical direction is same as that in the horizontal direction. The coefficients for the frequency compensation calculated as the reciprocal of R(u,v) which is generated by multiplication of R(u) and R(V) are shown in FIG. 6. In FIG. 6, the horizontal grid location corresponds to horizontal frequency v and the vertical grid location corresponds to vertical frequency u. Thus, the value presented in the grid corresponding to horizontal frequency v and vertical frequency u means the compensating coefficient that is the reciprocal of R(u,v) and should be multiplied to the frequency coefficient corresponding to horizontal frequency v and vertical frequency u. Consequently, each compensating coefficient shown in FIG. 6 is multiplied to corresponding frequency coefficient of the set of frequency coefficients provided by the discrete cosine transformer 202 in the frequency response compensator 203.

Thereafter, the compensated frequency coefficients, F2(u, v), provided by the frequency response compensator 203 is applied to the inverse discrete cosine transformer 204. In the inverse discrete cosine transformer 204, pixel signals whose interval is a half of that of the original pixels in the horizontal direction and the vertical direction are generated by an inverse discrete cosine transformation. Consequently, when x2(i,j) defined by formula 7 shown in FIG. 9 is calculated by applying from 0 up to 2N−1 for i and j, pixel signal values that should be outputted by a solid-state imaging device comprising pixels divided in a half horizontally and vertically compared with original pixels are generated.

Thereafter, the interpolated pixel signal values generated by the inverse discrete cosine transformer 204 are arranged into an image signal that comprises horizontal scan lines doubled and horizontal pixels doubled compared with the original pixels by the arranging processor 205. Further, the image signal arranged by the arranging processor 205 is outputted as the output image signal of the interpolating processor 2.

Figure 7:
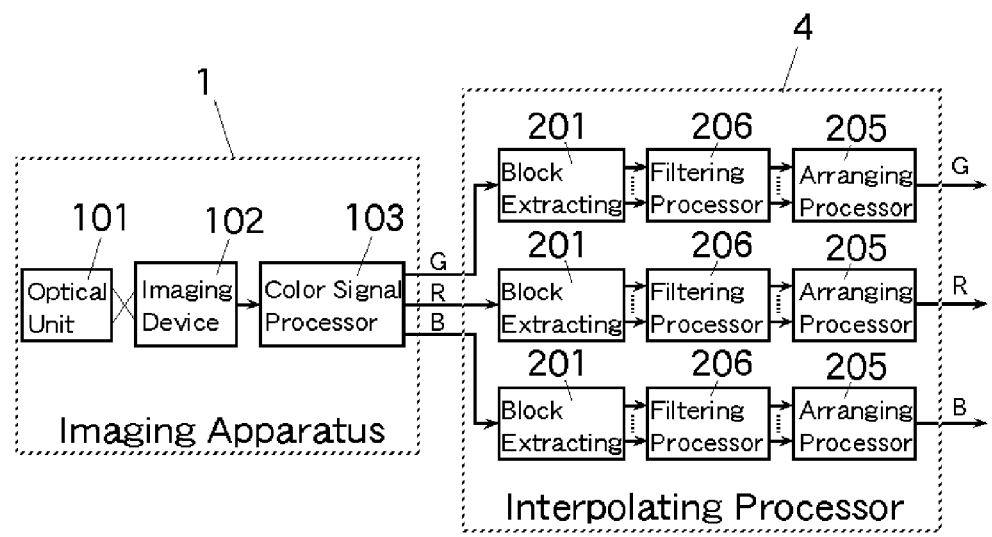
FIG. 7 is a block diagram showing the structure of an imaging apparatus according to another preferred embodiment of the present invention.

Another example of the structure of a video apparatus according to an embodiment of the present invention is shown in FIG. 7. In FIG. 7, the imaging apparatus 1 is assumed to be same as that shown in FIG. 1.

The green signal, the red signal, and the blue signal, being provided by the color signal processor 103 in the imaging apparatus 1, are applied to an interpolating processor 4. In the interpolating processor 4, each of the green signal, the red signal, and the blue signal is applied to the block-extracting processor 201 respectively. Here, the function of the block-extracting processor 201 is same as that in the interpolating processor 2 shown in FIG. 1.

On the other hand, the block of pixel signal values extracted by the block-extracting processor 201 is applied to a filtering processor 206 in the interpolating processor 4.

As disclosed in U.S. Pat. No. 7,139,443, when an interpolated pixel signal value is generated by a discrete cosine transformation and an inverse discrete cosine transformation, the interpolated pixel signal value is composed by a linear combination of the pixel signal values in the block of pixel signal values. Thus, the interpolated pixel signal value can be obtained by a two-dimensional filter processing to the block of pixel signal values applied to the discrete cosine transformer 202. Furthermore as mentioned above, the processing of the frequency response compensator 203 in the interpolating processor 2 shown in FIG. 1 is accomplished by multiplying each compensating coefficient to corresponding frequency coefficient in the set of frequency coefficients. Thus, the interpolated pixel signal value compensated by the frequency response compensator 203 can be obtained by a linear combination of the pixel signal values in the block of pixel signal values, and can be obtained by a two-dimensional filter processing to the block of pixel signal values.

Hence, when the filtering processor 206 is assumed to comprise sets of filtering coefficients, wherein each set of filtering coefficients corresponds to processing for generation of each of interpolated pixel signal values that are generated by the discrete cosine transformer 202, the frequency response compensator 203, and the inverse discrete cosine transformer 204, the output signal values generated by the filtering processor 206 become same as that generated by the inverse discrete cosine transformer 204 in FIG. 1.

Here, the set of filtering coefficients for the filtering processor 206 can be obtained by the procedure disclosed in U.S. Pat. No. 7,139,443. That is, only one pixel signal value selected from the block of pixel signal values arbitrarily is set to "1", and other pixel signal values are set to "0". Then, an interpolated pixel signal value corresponding to a predetermined location is generated by processing of the discrete cosine transformer, the frequency response compensator, and the inverse discrete cosine transformer. Here, the interpolated pixel signal value is defined as the filtering coefficient of the set of filtering coefficients for the predetermined location, wherein the location of the filtering coefficient in the set of filtering coefficients corresponds to the pixel which is set to "1" in the block of pixel signal values.

The output signal values generated by the filtering processor 206 are applied to the arranging processor 205 like the output signal values generated by the inverse discrete cosine transformer 204 in the interpolating processor 2 shown in FIG. 1 are, and are converted into an image signal that comprises horizontal scan lines doubled and horizontal pixels doubled compared with the original pixels. Further, the image signal generated by the arranging processor 205 in the interpolating processor 4 is applied to following display apparatus or transmission apparatus which is not shown in FIG. 7.

In the above descriptions, the procedure for the red signal or the blue signal is assumed same as that of the green signal. However, when the color signal processor outputs a luminance signal and two chrominance signals, the procedure employing the present invention may be employed only for the luminance signal. Here, the chrominance signals may be interpolated by a conventional method.

Further, though the imaging apparatus is followed by the interpolating processor directly in the above descriptions, it is apparent that the transmission apparatus could be inserted between the imaging apparatus and the interpolating processor.

Additionally, though the discrete cosine transformation is adopted as an orthogonal transformation in the above descriptions, it is apparent that same result is expected by employing the discrete sine transformation or the hadamard transformation.

Furthermore, though the example in which the pixels are divided in the horizontal direction and the vertical direction is explained in the above descriptions, the inverse discrete cosine transformer may generate pixel signal values divided only in the horizontal direction or only in the vertical direction corresponding to the display apparatus.

Further, the aperture ratio of the pixels of the solid-state imaging device is assumed to be approximately 100% in the above descriptions. However, even when the aperture ratio of the pixels is lower than 100%, the compensating coefficient of the frequency response compensator 203 can be obtained as the reciprocal of the frequency response provided by formula 4, wherein the coefficient for adjacent pixels is amended to lower than ½ and the coefficient for pixels which exist in the slanted directions is amended to lower than ¼.

Figure 8A:
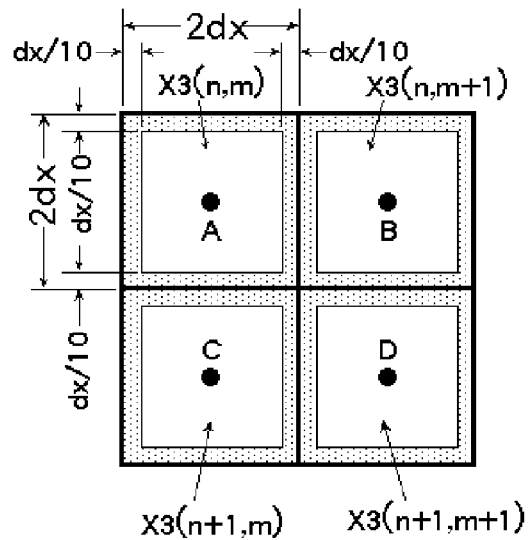
FIG. 8A is an illustration of adjacent four pixels not divided, wherein the aperture ratio of pixel is 81%.

For example, the aperture ratio is assumed to be 81% in which the light injected to a pixel area of 90% in the horizontal direction and in the vertical direction is used to generate the pixel signal. Additionally, it is assumed that the pixel size is 2dx in the horizontal direction and the vertical direction as shown in FIG. 8A, and it is assumed that the light injected to the surrounding portion of the pixel up to dx/10 from the circumference does not generate the pixel signal. Here, when the pixels are divided in same manner as shown in FIG. 4B, the divided pixels are represented in FIG. 8B.

Figure 8B:
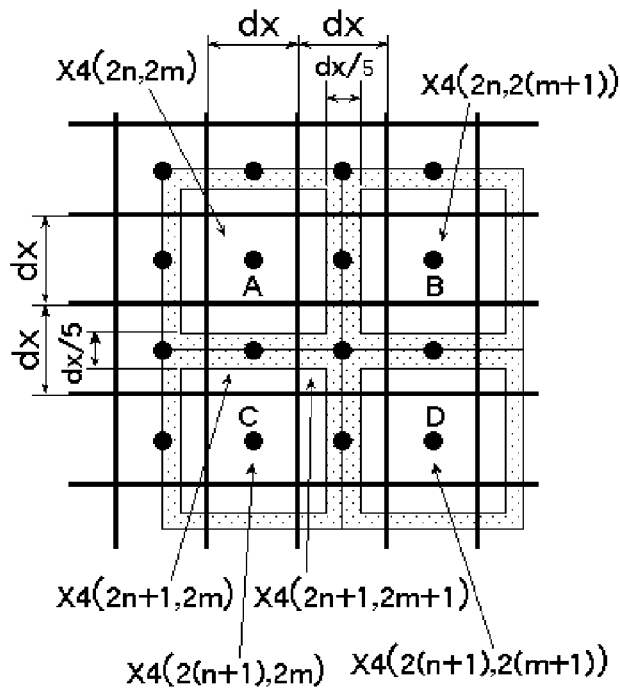
FIG. 8B is an illustration of divided pixels corresponding to the pixels shown in FIG. 8A.

As shown in FIG. 8B, though the aperture ratio of the pixel X4(2n,2m) is still 100%, the aperture ratio of the pixel X4(2n+1,2m) is 80% because the light injected to a pixel area of 20% which corresponds to dx/5 of the pixel size dx in the vertical direction is not used to generate the pixel signal. Also, the aperture ratio of the pixel X4(2n+1,2m+1) is 64% because the light injected to a pixel area of 20% in the horizontal direction and the vertical direction is not used to generate the pixel signal.

Here, formula 8 which represents the pixel signal x3(n,m) generated by X3(n,m) shown in FIG. 8A is defined instead of formula 2, $$x3(n, m) = x4(2n, 2m) + \quad (8)$$
$$\{x4(2n-1, 2m) + x4(2n, 2m-1) + x4(2n, 2m+1) +$$
$$x4(2n+1, 2m)\} * 2/5 +$$
$$\{x4(2n-1, 2m-1) + x4(2n-1, 2m+1) +$$
$$x4(2n+1, 2m-1) + x4(2n+1, 2m+1)\} * 4/25,$$

and formula 9 which represents the frequency response R2(v) is defined instead of formula 6, $$R2(v) = 5/9 * \{1 + 4/5 * \cos(2 * PHI * v / 32dx * dx)\} \quad (9)$$
$$= 5/9 * \{1 + 4/5 \cdot \cos(PHI * v / 16)\}.$$

When the aperture ratio in the horizontal direction and in the vertical direction is defined as "a", the frequency response R3(v) is represented by formula 10, wherein "a" is assumed to be from ½ up to 1, $$R3(v) = 1/2a * \{1 + (2a-1) * \cos(2 * PHI * v / 32dx * dx)\} \quad (10)$$
$$= 1/2a * \{1 + (2a-1) * \cos(PHI * v / 16)\}.$$

Thus, the compensating coefficient of the frequency response compensator 203 is obtained as the reciprocal of R3(v) calculated by formula 10.

Furthermore, although the invention has been described as being realized by hardware processing, it is apparent to one skilled in the art that the invention can be realized by software processing.

I claim:

1. A method for processing an image signal wherein said image signal is consisted of a plurality of pixel signal values arranged two-dimensionally, comprising:
   (a) extracting a block of pixel signal values from said pixel signal values;
   (b) producing a set of frequency coefficients by an orthogonal transformation with said block of pixel signal values;
   (c) providing a set of compensating coefficients;
   (d) converting said set of frequency coefficients to a set of compensated frequency coefficients by multiplying each compensating coefficient of said set of compensating coefficients to a corresponding frequency coefficient of said set of frequency coefficients;
   (e) producing at least one represented pixel signal value that corresponds to a arbitrary location between adjacent pixel signal values of said block of pixel signal values by an inverse transformation of said orthogonal transformation with said set of compensated frequency coefficients by decreasing an interval for reproduction of pixel signal values; and
   (f) applying said represented pixel signal value to a converted image signal as a pixel signal value corresponding to said arbitrary location of said converted image signal,
   wherein each compensating coefficient of said set of compensating coefficients corresponds to a ratio of a frequency response caused by sampling by the pixels of said converted image signal to a frequency response caused by sampling by the pixels of said image signal at corresponding frequency.

2. A method according to claim 1 wherein said orthogonal transformation is a discrete cosine transformation.

3. A method according to claim 1 wherein said ratio of a frequency response caused by sampling by the pixels of said converted image signal to a frequency response caused by sampling by the pixels of said image signal at corresponding frequency is defined as $$2a/\{1+(2a-1)*\cos(2*PHI*f*dx)\},$$

where "a" means the aperture ratio of said pixel of said image signal of related direction and is defined to be from ½ up to 1,
   "dx" means the size of said pixel of said converted image signal of related direction,
   "f" means said corresponding frequency and is defined to be less than 1/(4dx),
   "PHI" means pi,
   and "*" means multiplication.

4. A method according to claim 2 wherein said ratio of a frequency response caused by sampling by the pixels of said converted image signal to a frequency response caused by sampling by the pixels of said image signal at corresponding frequency is defined as $$2a/\{1+(2a-1)*\cos(2*PHI*f*dx)\},$$

where "a" means the aperture ratio of said pixel of said image signal of related direction and is defined to be from ½ up to 1,
   "dx" means the size of said pixel of said converted image signal of related direction,
   "f" means said corresponding frequency and is defined to be less than 1/(4dx),
   "PHI" means pi,
   and "*" means multiplication.

5. A method for processing an image signal wherein said image signal is consisted of a plurality of pixel signal values arranged two-dimensionally, comprising:
   (a) extracting a block of pixel signal values from said pixel signal values;
   (b) providing at least one set of coefficients corresponding to a arbitrary location between adjacent pixel signal values of said block of pixel signal values;

(c) producing a represented pixel signal value by integrating all of pixel signal values in said block of pixel signal values, each pixel signal value in said block of pixel signal values being multiplied by corresponding coefficient of said set of coefficients; and (d) applying said represented pixel signal value to a converted image signal as a pixel signal value corresponding to said arbitrary location of said converted image signal, wherein said providing at least one set of coefficients corresponding to said arbitrary location includes:

defining a block of impulse signal values, said block of impulse signal values comprising a signal value one at only one arbitrary sampling location in said block of impulse signal values and signal values zero at other sampling locations;

producing a set of frequency coefficients by a orthogonal transformation with said block of impulse signal values;

preparing a set of compensating coefficients;

converting said set of frequency coefficients to a set of compensated frequency coefficients by multiplying each compensating coefficient of said set of compensating coefficients to a corresponding frequency coefficient of said set of frequency coefficients;

producing an output signal value corresponding to said arbitrary location by an inverse transformation of said orthogonal transformation with said set of compensated frequency coefficients, said inverse transformation representing signal values between adjacent signal values of said block of impulse signal values by decreasing an interval for reproduction of pixel signal values; and applying said output signal value to said set of coefficients as a coefficient corresponding to said arbitrary sampling location, wherein each compensating coefficient of said set of compensating coefficients corresponds to a ratio of a frequency response caused by sampling by the pixels of said converted image signal to a frequency response caused by sampling by the pixels of said image signal at corresponding frequency.

6. A method according to claim 5 wherein said orthogonal transformation is a discrete cosine transformation.

7. A method according to claim 5 wherein said ratio of a frequency response caused by sampling by the pixels of said converted image signal to a frequency response caused by sampling by the pixels of said image signal at corresponding frequency is defined as $$2a/\{1+(2a-1)*\cos(2*PHI*f*dx)\},$$

where "a" means the aperture ratio of said pixel of said image signal of related direction and is defined to be from ½ up to 1, "dx" means the size of said pixel of said converted image signal of related direction, "f" means said corresponding frequency and is defined to be less than 1/(4dx), "PHI" means pi, and "*" means multiplication.

8. A method according to claim 6 wherein said ratio of a frequency response caused by sampling by the pixels of said converted image signal to a frequency response caused by sampling by the pixels of said image signal at corresponding frequency is defined as $$2a/\{1+(2a-1)*\cos(2*PHI*f*dx)\},$$

where "a" means the aperture ratio of said pixel of said image signal of related direction and is defined to be from ½ up to 1, "dx" means the size of said pixel of said converted image signal of related direction, "f" means said corresponding frequency and is defined to be less than 1/(4dx), "PHI" means pi, and "k" means multiplication.

* * * * *